(12) United States Patent
Sato et al.

(10) Patent No.: US 11,037,569 B2
(45) Date of Patent: Jun. 15, 2021

(54) OPERATIONAL SUPPORT APPARATUS, OPERATIONAL SUPPORT SYSTEM, AND OPERATIONAL SUPPORT METHOD

(71) Applicant: SHARP KABUSHIKI KAISHA, Sakai (JP)

(72) Inventors: Koji Sato, Sakai (JP); Hiroki Munetomo, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 114 days.

(21) Appl. No.: 16/419,722

(22) Filed: May 22, 2019

(65) Prior Publication Data

US 2019/0371336 A1 Dec. 5, 2019

(30) Foreign Application Priority Data

May 30, 2018 (JP) .............................. JP2018-103827

(51) Int. Cl.
*G10L 15/26* (2006.01)
*G06F 3/16* (2006.01)
*G06F 40/284* (2020.01)

(52) U.S. Cl.
CPC .............. *G10L 15/26* (2013.01); *G06F 3/167* (2013.01); *G06F 40/284* (2020.01)

(58) Field of Classification Search
CPC ... G10L 15/26; G10L 2015/088; G10L 15/22; G06F 40/284; G06F 3/167; H04N 7/15
USPC ......................................................... 704/235
See application file for complete search history.

(56) References Cited

U.S. PATENT DOCUMENTS

| 9,288,421 | B2 | 3/2016 | Cha et al. |
| 10,642,231 | B1* | 5/2020 | Billings ............. G05B 13/0265 |
| 2014/0019140 | A1 | 1/2014 | Cha et al. |

FOREIGN PATENT DOCUMENTS

| JP | 2014-021493 A | 2/2014 |
| WO | 2014/010981 A1 | 1/2014 |

* cited by examiner

*Primary Examiner* — Charlotte M Baker
(74) *Attorney, Agent, or Firm* — ScienBiziP, P.C.

(57) ABSTRACT

An operational support apparatus includes a speech recognizer and a controller. The speech recognizer converts speech data into text information. In a case where the text information contains a keyword that indicates a person, the controller identifies which of input terminals of the display apparatus is associated with the person. The controller generates a switching command to activate the input terminal thus identified.

7 Claims, 16 Drawing Sheets

FIG. 7

| REGISTRATION SCREEN | | |
|---|---|---|
| INPUT TERMINAL NAME (61) | CONNECTED APPARATUS NAME (62) | OWNER (63) |
| FIRST INPUT TERMINAL | FIRST TERMINAL | AAAA |
| SECOND INPUT TERMINAL | SECOND TERMINAL | BBBB |
| THIRD INPUT TERMINAL | THIRD TERMINAL | CCCC |

SAVE (64)   CANCEL (65)

FIG. 8

| DISPLAY APPARATUS ID | FIRST TAG | SECOND TAG | OWNER | LOGON USER |
|---|---|---|---|---|
| 12345 | FIRST INPUT TERMINAL | FIRST TERMINAL | AAAA | XXXX |
| | SECOND INPUT TERMINAL | SECOND TERMINAL | BBBB | YYYY |
| | THIRD INPUT TERMINAL | THIRD TERMINAL | CCCC | Null |

OPERATIONAL SUPPORT APPARATUS, OPERATIONAL SUPPORT SYSTEM, AND OPERATIONAL SUPPORT METHOD

BACKGROUND

1. Field

The present disclosure relates to an operational support apparatus, an operational support system, and an operational support method that support a user in operating a display apparatus.

2. Description of the Related Art

Japanese Unexamined Patent Application Publication No. 2014-021493 discloses a broadcast reception apparatus that utilizes speech recognition technology to support a user's operation. The broadcast reception apparatus disclosed in Japanese Unexamined Patent Application Publication No. 2014-021493 activates an external input terminal to which an external input device corresponding to a user's speech is connected, and displays a picture that is received from the external input device corresponding to the user's speech. Specifically, the broadcast reception apparatus disclosed in Japanese Unexamined Patent Application Publication No. 2014-021493 includes external input terminals, a call word setter, a storage, a speech recognizer, a controller, and a display. Further, the broadcast reception apparatus is communicably connected to a server.

External input devices are connected to the external input terminals. The call word setter sets call words for the external input devices. The storage has stored therein a matching of a call word and an external input terminal to which an external input device corresponding to the call word is connected. The speech recognizer converts a user's speech into a digital signal and transmits the digital signal to the server. The server generates, on the basis of the digital signal, text information corresponding to the user's speech. The controller determines, on the basis of the text information received from the server, whether the user's speech contains the call word, and in a case where the user's speech contains the call word, the controller activates the external input terminal corresponding to the call word, and controls the display so that the display displays a picture that the external input terminal corresponding to the call word receives. Examples of call words disclosed in Japanese Unexamined Patent Application Publication No. 2014-021493 are "video", "DVD", and "Blu-ray".

However, the broadcast reception apparatus disclosed in Japanese Unexamined Patent Application Publication No. 2014-021493 does not change from displaying one picture to displaying another picture even when a user vocalizes a keyword that indicates a person such as an owner of an external input device.

It is desirable to provide an operational support apparatus, an operational support system, and an operational support method that make it possible to cause a display apparatus to change from displaying one piece of image information to displaying another piece of image information in accordance with a keyword that indicates a person.

SUMMARY

According to a first aspect of the disclosure, there is provided an operational support apparatus including a speech recognizer and a controller. The speech recognizer converts speech data into text information. In a case where the text information contains a keyword that indicates a person, the controller identifies which of input terminals of the display apparatus is associated with the person. The controller generates a switching command to activate the input terminal thus identified.

According to a second aspect of the disclosure, there is provided an operational support system including a display apparatus and an operational support apparatus that supports operation of the display apparatus. The operational support apparatus includes a speech recognizer and a controller. The speech recognizer converts speech data into text information. The controller generates a switching command to activate at least one of input terminals of the display apparatus. In a case where the text information contains a keyword that indicates a person, the controller identifies which of the input terminals of the display apparatus is associated with the person. The controller generates the switching command to activate the input terminal thus identified. The display apparatus displays image information received by the input terminal activated by the switching command.

According to a third aspect of the disclosure, there is provided an operational support method including converting speech data into text information, generating a switching command to activate at least one of input terminals of the display apparatus, and displaying image information received by the input terminal activated by the switching command. The generating the switching command includes, in a case where the text information contains a keyword that indicates a person, identifying which of the input terminals of the display apparatus is associated with the person, and generating the switching command to activate the input terminal thus identified.

BRIEF DESCRIPTION OF THE DRAWINGS

FIG. 7 is a diagram showing a registration screen according to the embodiment of the present disclosure;

FIG. 8 is a diagram showing a management table according to the embodiment of the present disclosure;

DESCRIPTION OF THE EMBODIMENTS

Figure 1:
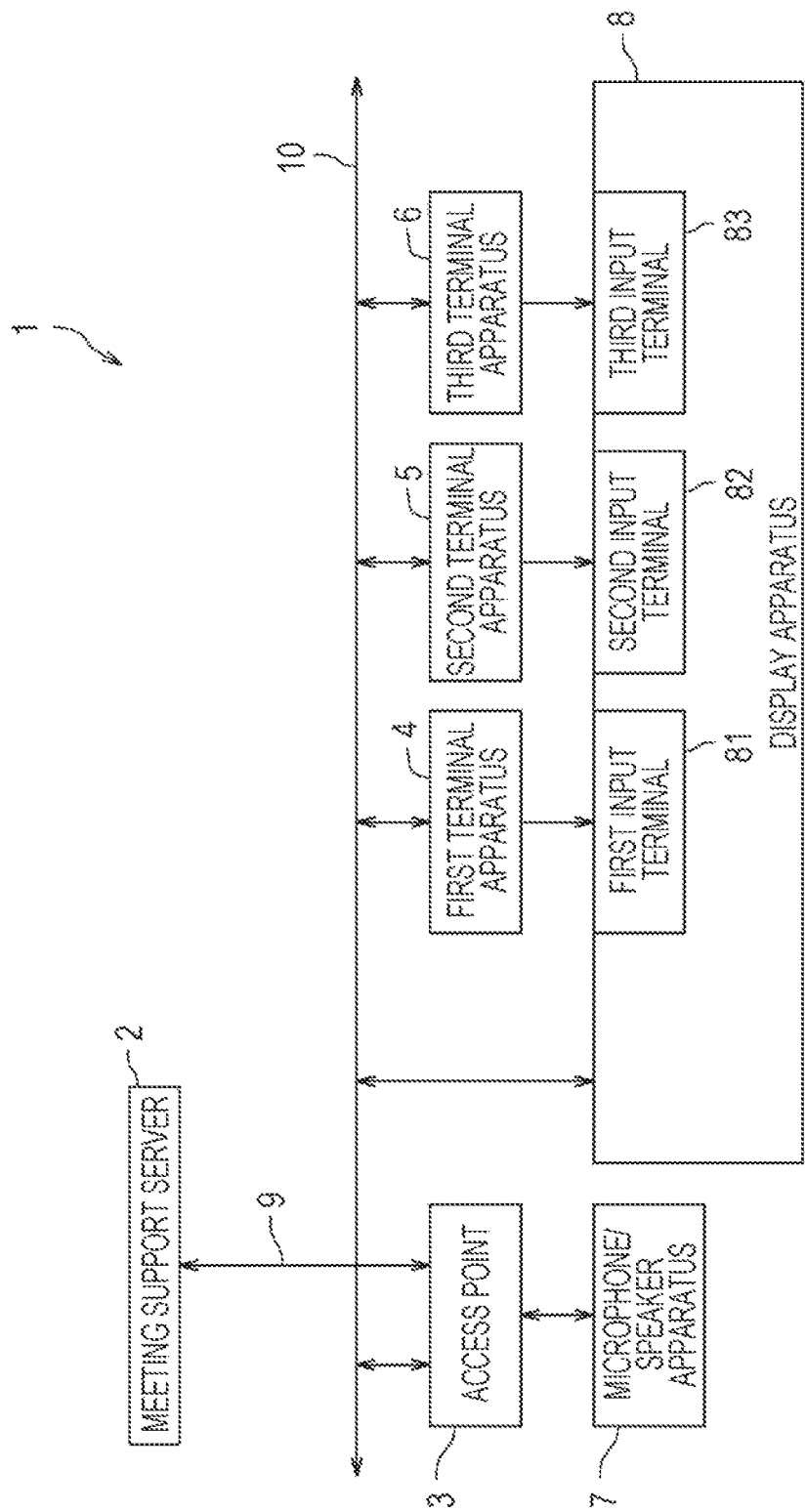
FIG. 1 is a diagram showing a meeting system according to an embodiment of the present disclosure.

The following describes embodiments of the present disclosure with reference to the drawings. Note, however, that the present disclosure is not limited to the following embodiments. In the drawings, identical or equivalent components are given the same reference signs and are not repeatedly described. Further, where a description is redundant, the description may be omitted as appropriate.

FIG. 1 is a diagram showing a meeting system 1 according to the present embodiment. The meeting system 1 is used for a meeting. The meeting system 1 is an example of an operational support system. As shown in FIG. 1, the meeting system 1 includes a meeting support server 2, an access point 3, first to third terminal apparatuses 4 to 6, a microphone/speaker apparatus 7, and a display apparatus 8.

In the present embodiment, the meeting support server 2 is an example of an operational support apparatus, and supports operation of the display apparatus 8. Specifically, in a case where the sounds of speech that a user has produced contains a predetermined keyword, the meeting support server 2 switches the display apparatus 8 from one display screen to another in accordance with the sounds of speech that the user has produced. In the following description, the sounds of speech that a user has produced are sometimes referred to as "user's speech".

The access point 3 connects an internet line 9 and a LAN (local area network) cable 10 to each other. To the LAN cable 10, the first to third terminal apparatuses 4 to 6 and the display apparatus 8 are connected. The meeting support server 2 performs communication with the first to third terminal apparatuses 4 to 6 via the internet line 9, the access point 3, and the LAN cable 10.

The access point 3 is connected to the microphone/speaker apparatus 7 via a wireless LAN. The meeting support server 2 performs communication with the microphone/speaker apparatus 7 via the internet line 9, the access point 3, and the wireless LAN.

The access point 3 may be connected to the first to third terminal apparatuses 4 to 6 via the wireless LAN or may be connected to the microphone/speaker apparatus 7 via the LAN cable 10.

The first to third terminal apparatuses 4 to 6 are connected to the display apparatus 8 and output image information to the display apparatus 8. The first terminal apparatus 4 performs communication with the display apparatus 8 via the LAN cable 10. The first terminal apparatus 4 may perform communication with the display apparatus 8 via a wireless LAN.

The first terminal apparatus 4 is not limited to a particular terminal apparatus, provided it can output image information. In the present embodiment, the first terminal apparatus 4 is a meeting room PC (personal computer). As the meeting room PC, a general-purpose personal computer can be used.

The second and third terminal apparatuses 5 and 6 are not limited to particular terminal apparatuses, provided they can output image information. The second and third terminal apparatuses 5 and 6 may for example be apparatuses that output video information acquired from an external server via the internet line 9. Alternatively, the second and third terminal apparatuses 5 and 6 may be general-purpose personal computers, video cameras, DVD playback apparatuses, or Blu-ray playback apparatuses. In the present embodiment, the second and third terminal apparatuses 5 and 6 are guest PCs.

The microphone/speaker apparatus 7, which is an example of a sound-collecting apparatus, collects the sounds of speech that a user has produced, converts the sounds thus collected into speech data (digital data), and transmits the speech data (digital data) to the meeting support server 2. Further, the microphone/speaker apparatus 7 outputs sounds of speech on the basis of speech data (digital data) received from the meeting support server 2.

The display apparatus 8 displays image information. Specifically, the display apparatus 8 includes first to third input terminals 81 to 83. To the first to third input terminals 81 to 83, apparatuses that are capable of outputting image information are connected. The first to third input terminals 81 to 83 are for example D-SUB terminals, HDMI (registered trademark) terminals, or DisplayPorts.

In the present embodiment, the first terminal apparatus 4 is connected to the first input terminal 81. The second terminal apparatus 5 is connected to the second input terminal 82. The third terminal apparatus 6 is connected to the third input terminal 83. The display apparatus 8 activates at least one of the first to third input terminals 81 to 83 and displays image information received by the input terminal thus activated. For example, in a case where the first input terminal 81 has been activated, the display apparatus 8 displays image information that the first input terminal 81 receives from the first terminal apparatus 4.

Figure 2:
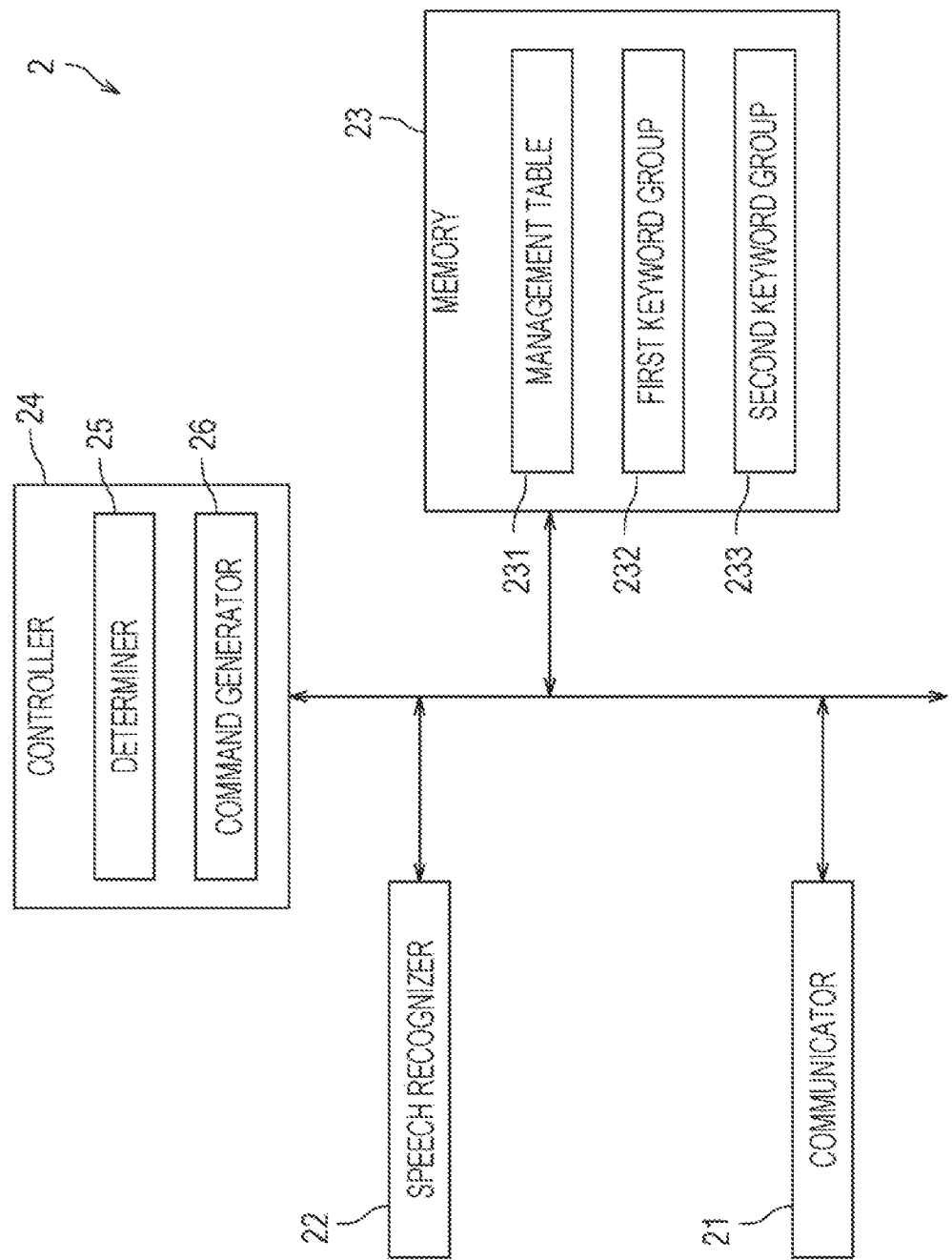
FIG. 2 is a diagram showing a configuration of a meeting support server according to the embodiment of the present disclosure.

Next, a configuration of the meeting support server 2 is described with reference to FIGS. 1 and 2. FIG. 2 is a diagram showing a configuration of the meeting support server 2. As shown in FIG. 2, the meeting support server 2 includes a communicator 21, a speech recognizer 22, a memory 23, and a controller 24.

The communicator 21 is connected to the internet line 9 (FIG. 1). For example, the communicator 21 includes a LAN board or a LAN module. The communicator 21 controls communication with the first to third terminal apparatuses 4 to 6 (FIG. 1) and the microphone/speaker apparatus 7 (FIG. 1).

The speech recognizer 22 receives speech data from the microphone/speaker apparatus 7 (FIG. 1) and converts the speech data into text information (hereinafter sometimes referred to as "recognition result text") by means of speech recognition technology. The speech recognizer 22 includes, for example, a speech recognition LSI (large-scale integrated circuit).

The memory 23 includes, for example, a semiconductor memories such as a RAM (random-access memory) and a ROM (read-only memory). Furthermore, the memory 23 includes a storage device such as an HDD (hard disk drive). The memory 23 has stored therein a control program that the controller 24 executes. The storage 23 of the present embodiment further has stored therein a management table 231, a first keyword group 232, and a second keyword group 233.

The management table 231 associates the first to third input terminals 81 to 83 (FIG. 1) of the display apparatus 8 with persons. In the present embodiment, the persons include the respective owners of the first to third terminal apparatuses 4 to 6 (FIG. 1) and logon users who have logged on to the first to third terminal apparatuses 4 to 6 (FIG. 1), respectively. More specifically, the management table 231 has registered therein identifiers that indicate the respective owners and identifiers that indicate the respective logon users.

The first keyword group 232 includes keywords that indicate the owners. The second keyword group 233 includes keywords that indicate the logon users. In the present embodiment, the first keyword group 232 includes keywords that indicate the respective identifiers of the owners. The second keyword group 233 includes keywords that indicate the respective identifiers of the logon users.

The identifiers of the owners are not limited to particular identifiers, provided they can be used to identify the owners. For example, the identifiers of the owners may be the full names, family names, first names, or arbitrarily-set nicknames of the owners. Similarly, the identifiers of the logon users are not limited to particular identifiers, provided they can be used to identify the logon users. For example, the identifiers of the logon users may be the full names, family names, first names, or arbitrarily-set nicknames of the logon users.

The controller 24 includes, for example, a processor such as a CPU (central processing unit) or an MPU (microprocessing unit). Further, the controller 24 (computer) controls, in accordance with the control program (computer program) stored in the memory 23, how the meeting support server 2 operates. In the present embodiment, the controller 24 executes the control program to function as a determiner 25 and a command generator 26.

The determiner 25 determines, with reference to the first keyword group 232 and the second keyword group 233, a keyword that is contained in a recognition result text. In a case where the determiner 25 has successfully determined a keyword that is contained in a recognition result text, the command generator 26 generates a switching command that corresponds to the keyword determined by the determiner 25. Having generated a switching command, the command generator 26 transmits the switching command thus generated to the first terminal apparatus 4 (FIG. 1) via the communicator 21. The switching command represents a command to activate at least one of the first to third input terminals 81 to 83 (FIG. 1) of the display apparatus 8.

In particular, in a case where a recognition result text contains a keyword that indicates the identifier of an owner or the identifier of a logon user, the command generator 26 identifies, with reference to the management table 231, which of the first to third input terminals 81 to 83 (FIG. 1) of the display apparatus 8 corresponds to the keyword contained in the recognition result text. Specifically, the command generator 26 identifies an input terminal associated with the identifier of an owner or the identifier of a logon user as indicated by a recognition result text. Having identified an input terminal, the command generator 26 generates a switching command to activate the input terminal thus identified. For example, in a case where a recognition result text indicates an identifier that corresponds to the owner of the first terminal apparatus 4 (FIG. 1) or a user who has logged on to the first terminal apparatus 4 (FIG. 4), the command generator 26 generates a switching command to activate the first input terminal 81 (FIG. 1).

On the other hand, in a case where the determiner 25 has failed to determine a keyword that is contained in a recognition result text, the controller 24 executes a speech data output process. Specifically, the controller 24 transmits predetermined speech data to the microphone/speaker apparatus 7 via the communicator 21. The predetermined speech data is stored in advance in the memory 23. The predetermined speech data represents a message that prompts the user to speak again. For example, the content of the message is "Could you say that again?".

The foregoing has described the meeting support server 2 with reference to FIGS. 1 and 2. Although the meeting support server 2 shown in FIG. 2 includes the speech recognizer 22, the controller 24 may alternatively have the function of the speech recognizer 22. In this case, the speech recognizer 22 is omitted.

Figure 3:
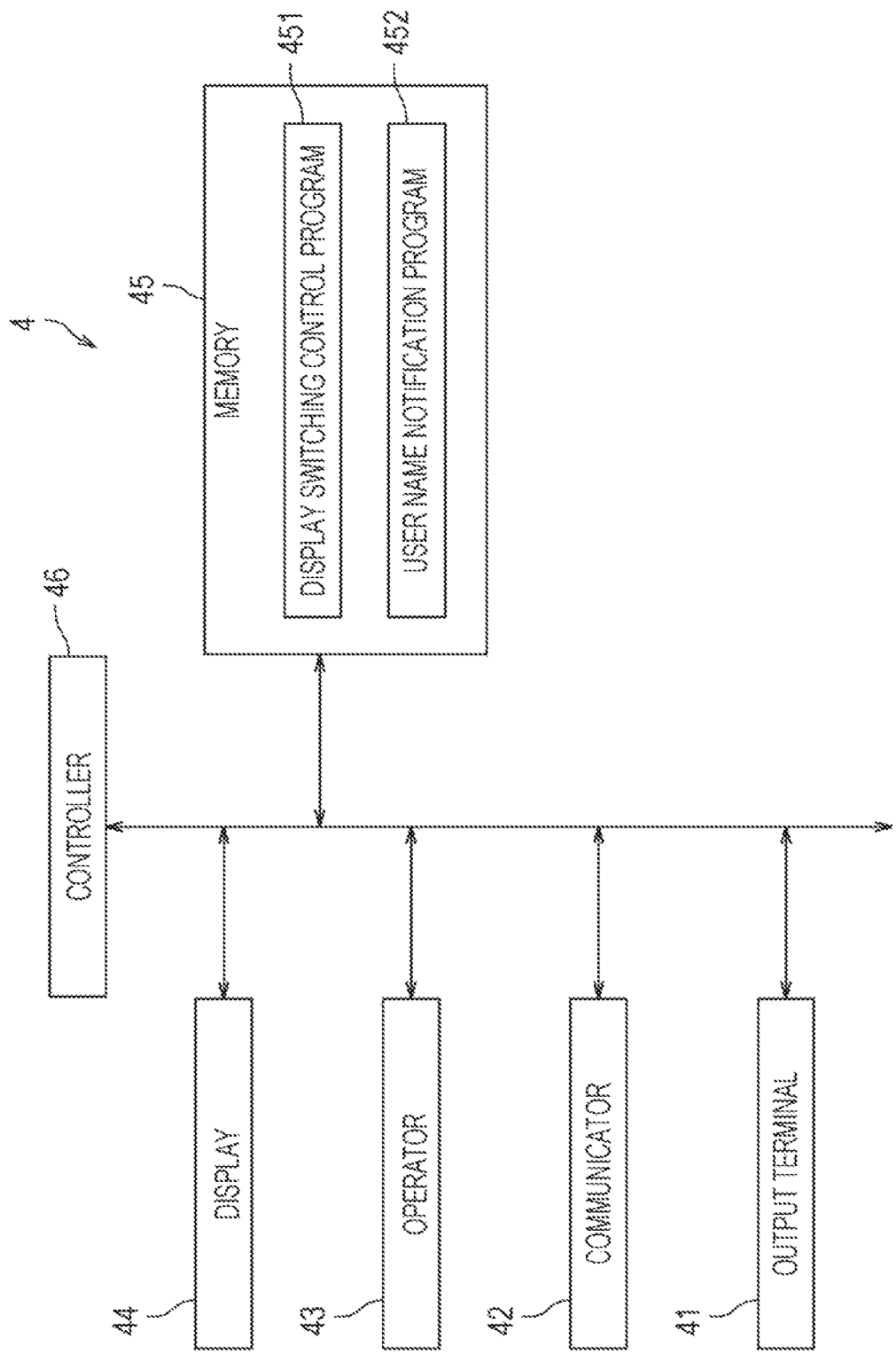
FIG. 3 is a diagram showing a configuration of a first terminal apparatus according to the embodiment of the present disclosure.

Next, a configuration of the first terminal apparatus 4 (meeting room PC) is described with reference to FIGS. 1 and 3. FIG. 3 is a diagram showing a configuration of the first terminal apparatus 4. As shown in FIG. 3, the first terminal apparatus 4 includes an output terminal 41, a communicator 42, an operator 43, a display 44, a memory 45, and a controller 46.

The output terminal 41 outputs image information. The output terminal 41 is connected to the first input terminal 81 (FIG. 1) of the display apparatus 8. In a case where the first input terminal 81 (FIG. 1) of the display apparatus 8 is activated, image information outputted from the output terminal 41 is displayed by the display apparatus 8 (FIG. 1).

The communicator 42 is connected to the LAN cable 10 (FIG. 1). The communicator 42 includes, for example, a LAN board or a LAN module. The communicator 42 controls communication with the meeting support server 2 (FIG. 1). Further, the communicator 42 controls communication with the display apparatus 8 (FIG. 1). Specifically, the communicator 42 receives a switching command from the meeting support server 2 (FIG. 1). Further, the communicator 42 transmits a switching command to the display apparatus 8 (FIG. 1).

The operator 43 is operated by a user to receive an instruction from the user. The operator 43 outputs, to the controller 46, a signal corresponding to the user's operation. As a result, the first terminal apparatus 4 executes an action corresponding to the operation accepted by the operator 43. The operator 43 includes, for example, a pointing device and a keyboard. The operator 43 may also include a touch sensor. The touch sensor is stacked on a display surface of the display 44. For example, the user logs on to the first terminal apparatus 4 by operating the operator 43. Further, the user logs out of the first terminal apparatus 4 by operating the operator 43.

The display 44 displays various types of screen. In the present embodiment, the display 44 displays a registration screen 60, which will be described later with reference to FIG. 6. The registration screen 60 is a user interface screen, and accepts registration of various types of information. An example of the display 44 is a liquid crystal display or an organic EL (electroluminescence) display. In a case where the touch sensor is stacked on the display surface of the display 44, the display 44 functions as a touch display.

The memory 45 includes, for example, semiconductor memories such as a RAM and a ROM. Furthermore, the memory 45 includes a storage device such as an HDD. The memory 45 has stored therein a control program that the controller 46 executes. The memory 45 further has stored therein a display switching control program 451 and a user name notification program 452.

The display switching control program 451 is a program for transmitting, to the display apparatus 8 (FIG. 1), a switching command received from the meeting support server 2 (FIG. 1). The user name notification program 452 is a program for transmitting, to the meeting support server 2 (FIG. 1), the identifier of a user who has logged on to the first terminal apparatus 4.

The controller 46 includes, for example, a processor such as a CPU. Further, the controller 46 (computer) controls, in accordance with the control program (computer program) stored in the memory 45, how the first terminal apparatus 4 operates.

In the present embodiment, the controller 46 executes the display switching control program 451 to transmit, to the display apparatus 8 (FIG. 1), a switching command received from the meeting support server 2 (FIG. 1). Further, the controller 46 executes the user name notification program 452 to transmit, to the meeting support server 2 (FIG. 1), information indicating the identifier of a user who has logged on to the first terminal apparatus 4. Furthermore, the controller 46 executes the user name notification program 452 to transmit, to the meeting support server 2 (FIG. 1), information indicating the identifier of a user who has logged out of the first terminal apparatus 4.

The controller 46 may also transmit image data representing an image being displayed on the display 44 to the first input terminal 81 (FIG. 1) via the output terminal 41 (FIG. 1) and the LAN cable 10 (FIG. 1) to cause the display apparatus 8 (FIG. 1) to display the image being displayed on the display 44.

Figure 4:
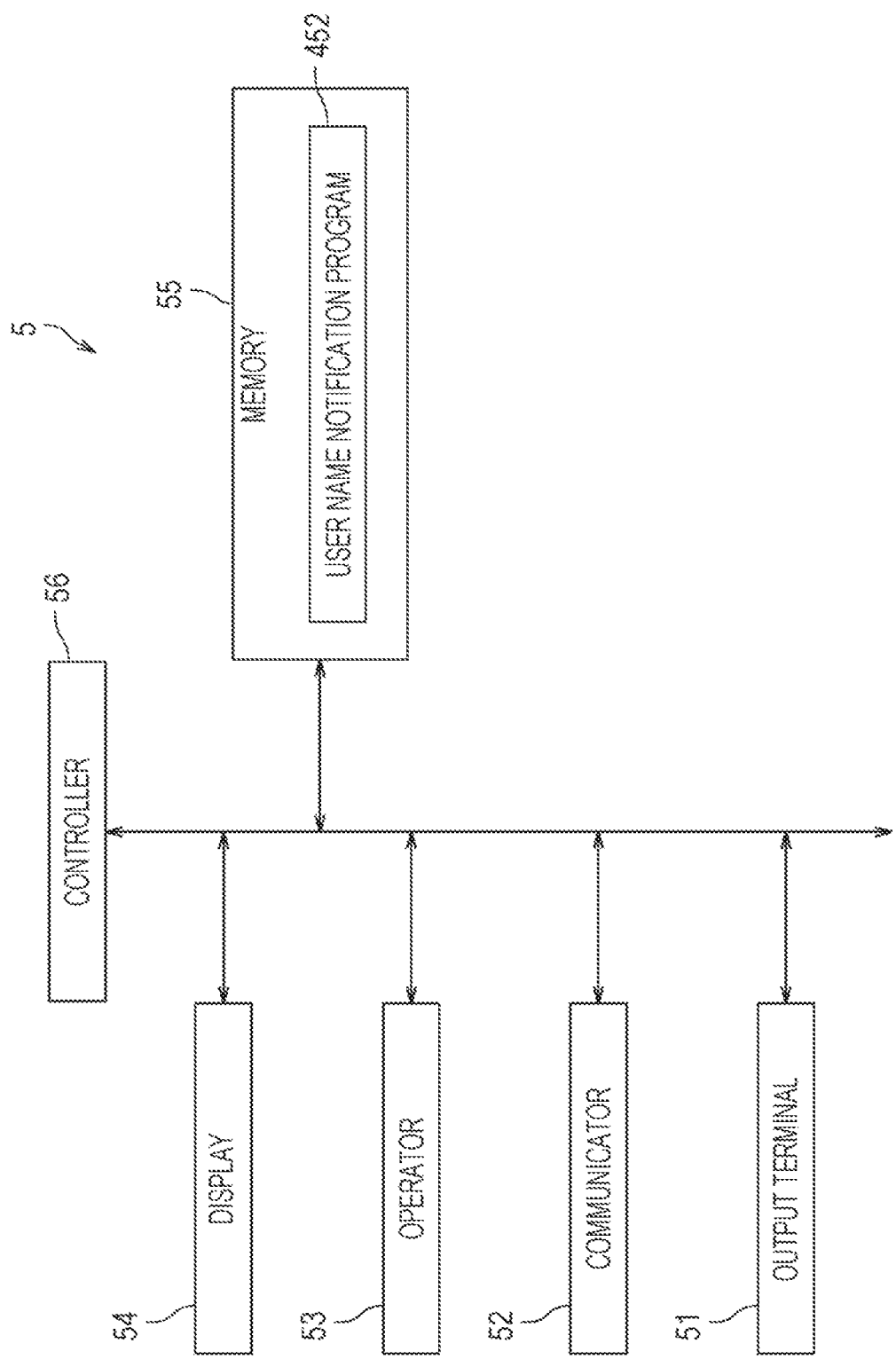
FIG. 4 is a diagram showing a configuration of a second terminal apparatus according to the embodiment of the present disclosure.

Next, a configuration of the second terminal apparatus 5 (guest PC) is described with reference to FIGS. 1 and 4. FIG. 4 is a diagram showing a configuration of the second terminal apparatus 5. As shown in FIG. 4, the second terminal apparatus 5 includes an output terminal 51, a communicator 52, an operator 53, a display 54, a memory 55, and a controller 56.

The output terminal 51 outputs image information. The output terminal 51 is connected to the second input terminal 82 (FIG. 1) of the display apparatus 8. In a case where the second input terminal 82 (FIG. 1) of the display apparatus 8 is activated, image information outputted from the output terminal 51 is displayed by the display apparatus 8 (FIG. 1).

The communicator 52 is connected to the LAN cable 10 (FIG. 1). The communicator 52 includes, for example, a LAN board or a LAN module. The communicator 52 controls communication with the meeting support server 2 (FIG. 1). Specifically, the communicator 52 transmits, to the meeting support server 2 (FIG. 1), information indicating the identifier of a user who has logged on to the second terminal apparatus 5. Furthermore, the communicator 52 transmits, to the meeting support server 2 (FIG. 1), information indicating the identifier of a user who has logged out of the second terminal apparatus 5.

The operator 53 is operated by a user to receive an instruction from the user. The operator 53 outputs, to the controller 56, a signal corresponding to the user's operation. As a result, the second terminal apparatus 5 executes an action corresponding to the operation accepted by the operator 53. The operator 53 includes, for example, a pointing device and a keyboard. The operator 53 may also include a touch sensor. The touch sensor is stacked on a display surface of the display 54. For example, the user logs on to the second terminal apparatus 5 by operating the operator 53. Further, the user logs out of the second terminal apparatus 5 by operating the operator 53.

The display 54 displays various types of screen. An example of the display 54 is a liquid crystal display or an organic EL (electroluminescence) display. In a case where the touch sensor is stacked on the display surface of the display 54, the display 54 functions as a touch display.

The memory 55 includes, for example, semiconductor memories such as a RAM and a ROM. Furthermore, the memory 55 includes a storage device such as an HDD. The memory 55 has stored therein a control program that the controller 56 executes. The memory 55 further has stored therein the user name notification program 452.

The controller 56 includes, for example, a processor such as a CPU. Further, the controller 56 (computer) controls, in accordance with the control program (computer program) stored in the memory 55, how the second terminal apparatus 5 operates.

In the present embodiment, the controller 56 executes the user name notification program 452 to transmit, to the meeting support server 2 (FIG. 1), information indicating the identifier of a user who has logged on to the second terminal apparatus 5. Furthermore, the controller 56 executes the user name notification program 452 to transmit, to the meeting support server 2 (FIG. 1), information indicating the identifier of a user who has logged out of the second terminal apparatus 5.

The foregoing has describes the second terminal apparatus 5. A description of the third terminal apparatus 6, which is similar in configuration to the second terminal apparatus 5, is omitted.

Figure 5:
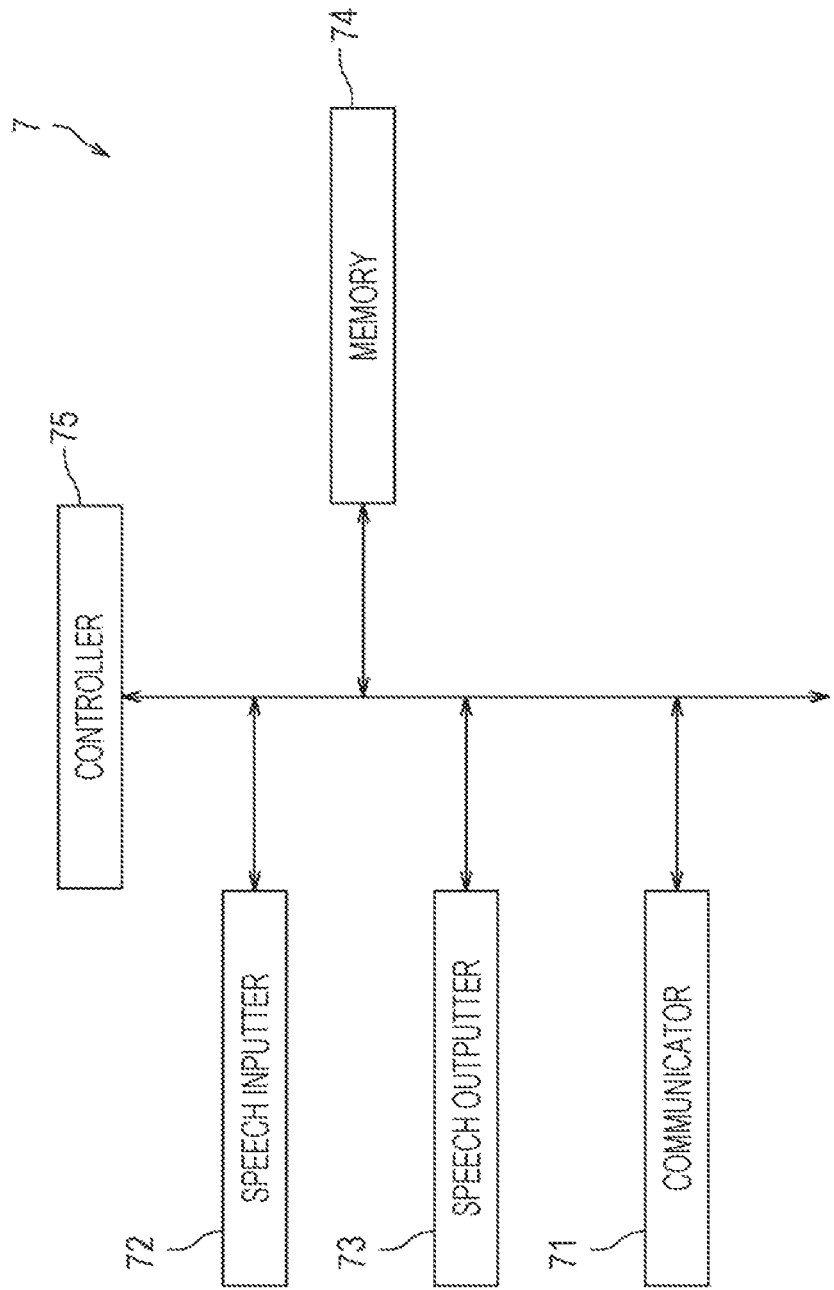
FIG. 5 is a diagram showing a configuration of a microphone/speaker apparatus according to the embodiment of the present disclosure.

Next, a configuration of the microphone/speaker apparatus 7 is described with reference to FIGS. 1 and 5. FIG. 5 is a diagram showing a configuration of the microphone/speaker apparatus 7. As shown in FIG. 5, the microphone/speaker apparatus 7 includes a communicator 71, a speech inputter 72, a speech outputter 73, a memory 74, and a controller 75.

The communicator 71 is connected to the access point 3 (FIG. 1). The communicator 71 controls communication with the meeting support server 2 (FIG. 1). Specifically, the communicator 71 transmits speech data to the meeting support server 2 (FIG. 1). Further, the communicator 71 receives speech data from the meeting support server 2 (FIG. 1). An example of the communicator 71 is a wireless LAN board or a wireless LAN module.

The speech inputter 72 collects the sounds of speech that a user has produced, and converts the sounds thus collected into an analog electric signal. The analog electric signal is inputted to the controller 75. An example of the speech inputter 72 is a microphone. The speech outputter 73 outputs the sounds of speech that correspond to speech data received from the meeting support server 2 (FIG. 1). An example of the speech outputter 73 is a speaker.

The memory 74 includes, for example, semiconductor memories such as a RAM and a ROM. The memory 74 may further include a storage device such as an HDD. The memory 74 has stored therein a control program that the controller 75 executes.

The controller 75 includes, for example, a processor such as a CPU or an MPU. Further, the controller 75 (computer) controls, in accordance with the control program (computer program) stored in the memory 74, how the microphone/speaker apparatus 7 operates.

Figure 6:
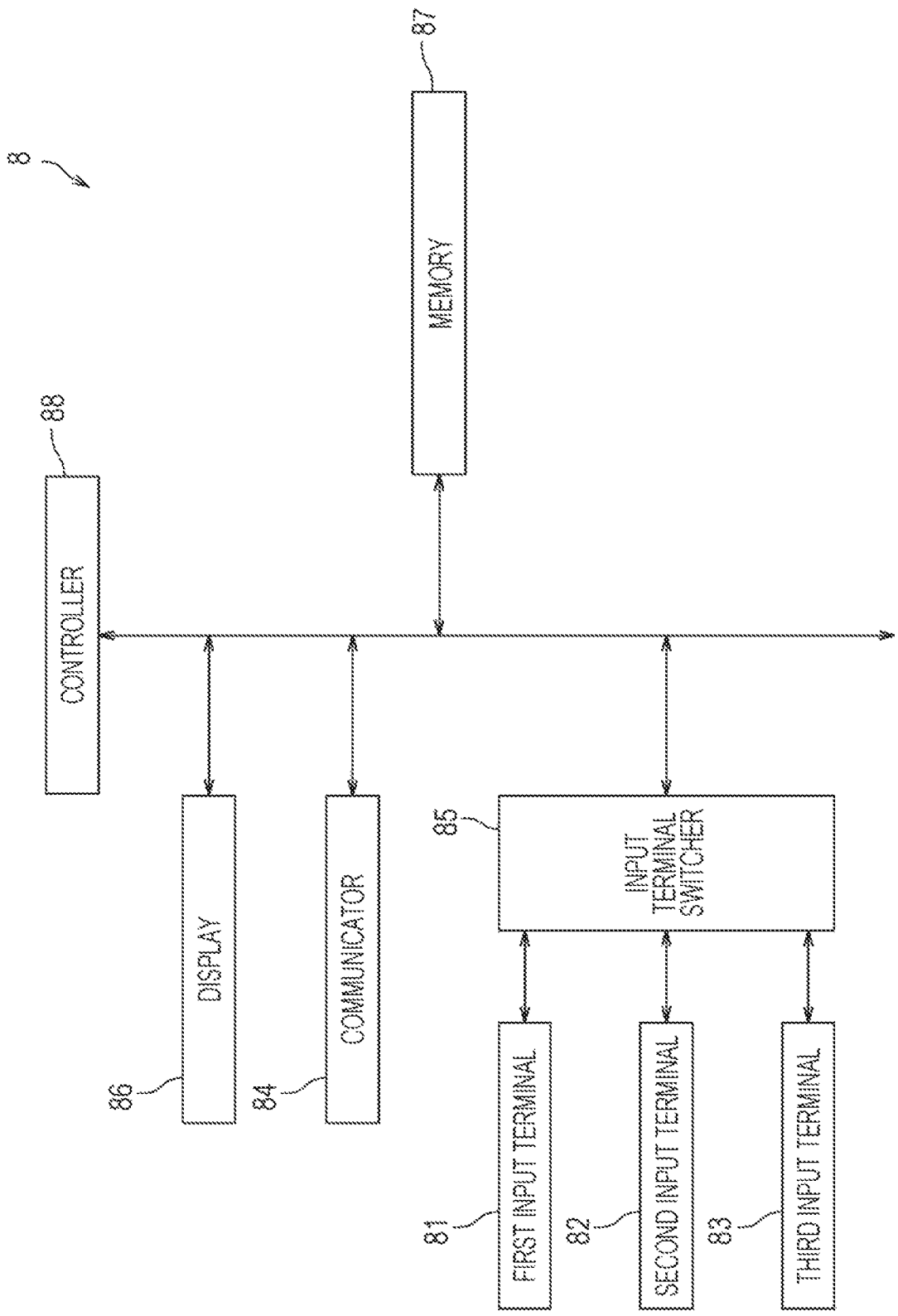
FIG. 6 is a diagram showing a configuration of a display apparatus according to the embodiment of the present disclosure.

Next, a configuration of the display apparatus 8 is described with reference to FIGS. 1 and 6. FIG. 6 is a diagram showing a configuration of the display apparatus 8. As shown in FIG. 6, the display apparatus 8 includes a communicator 84, an input terminal switcher 85, a display 86, a memory 87, and controller 88 in addition to the first to third input terminals 81 to 83 described with reference to FIG. 1.

The communicator 84 is connected to the LAN cable 10 (FIG. 1). The communicator 84 includes, for example, a LAN board or a LAN module. The communicator 84 controls communication with the first terminal apparatus 4 (FIG. 1). Specifically, the communicator 84 receives a switching command from the first terminal apparatus 4 (FIG. 1).

The input terminal switcher 85 activates at least one of the first to third input terminals 81 to 83. In the present embodiment, the input terminal switcher 85 activates any one of the first to third input terminals 81 to 83 in accordance with a switching command.

The display 86 displays image information that is received by that one of the first to third input terminals 81 to 83 which has been activated. An example of the display 86 is a liquid crystal display or an organic EL display. The display 86 includes a touch sensor. In other words, the display 86 may be a touch display.

The memory 87 includes, for example, semiconductor memories such as a RAM and a ROM. Furthermore, the memory 87 may include a storage device such as an HDD. The memory 87 has stored therein a control program that the controller 88 executes.

The controller 88 includes, for example, a processor such as a CPU or an MPU. Further, the controller 88 (computer) controls, in accordance with the control program (computer program) stored in the memory 87, how the display apparatus 8 operates. The controller 88 of the present embodiment controls the input terminal switcher 85 in accordance with a switching command. Specifically, the controller 88 activates any of the first to third input terminals 81 to 83 in accordance with a switching command.

The foregoing has described the present embodiment with reference to FIGS. 1 to 6. Although, in the present embodiment, the meeting support server 2 executes a speech recognition process, the microphone/speaker apparatus 7 may alternatively execute a speech recognition process to transmit a recognition result text to the meeting support server 2.

The present embodiment makes it possible to cause the display apparatus 8 to change from displaying one piece of image information to displaying another piece of image information in accordance with a keyword that indicates a person. For example, in a case where a keyword contained in a user's speech indicates the identifier of the owner of the first terminal apparatus 4, the input terminal 81 becomes activated so that the display apparatus 8 can display an image being displayed by the display 44 of the first terminal apparatus 4.

Further, the present embodiment makes it possible to easily create a switching command, as it creates a switching command with reference to the management table 231.

Next, the registration screen 60 is described with reference to FIGS. 1 to 3 and FIGS. 6 and 7. FIG. 7 is a diagram showing the registration screen 60 according to the present embodiment. The registration screen 60 is an interface screen that is displayed on the display 44 (FIG. 3) of the first terminal apparatus 4. A user can operate the operator 43 (FIG. 3) of the first terminal apparatus 4 to enter (register) various types of information into the registration screen 60. The first terminal apparatus 4 (FIG. 3) may transmit image data representing the user interface screen to the display apparatus 8 (FIG. 6) to cause the display 86 (FIG. 6) of the display apparatus 8 to display the user interface screen being displayed on the display 44 (FIG. 3) of the first terminal apparatus 4.

As shown in FIG. 7, the registration screen 60 of the present embodiment displays an input terminal name column 61, a connected apparatus name registration column 62, and an owner information registration columns 63. Further, the registration screen 60 displays a save button 64 and a cancel button 65.

Into the input terminal name column 61, names (default names) set in advance as the respective names of the first to third input terminals 81 to 83 (FIG. 1) are entered. Specifically, "D-SUB terminal", "HDMI (registered trademark) terminal", "DisplayPort", or the like is entered into the input terminal name column 61.

Into the connected apparatus name registration column 62, the names (apparatus names) of the apparatuses that are connected to the first to third input terminals 81 to 83 (FIG. 1), respectively, are entered. The apparatus names are arbitrarily determined by users. In the present embodiment, the names of the first to third terminal apparatuses 4 to 6 (FIG. 1) are entered.

Into the owner information registration column 63, the identifiers of the owners of apparatuses that are connected to the first to third input terminals 81 to 83 (FIG. 1), respectively, are entered. In the present embodiment, the identifiers of the respective owners of the first to third terminal apparatuses 4 to 6 (FIG. 1) are entered into the owner information registration column 63.

The save button 64 is a button for saving information entered into the registration screen 60. When a user operates the operator 43 (FIG. 3) to input an instruction to depress the save button 64, the information entered into the registration screen 60 is saved and the controller 24 (FIG. 2) of the meeting support server 2 creates the management table 231 (FIG. 2).

The cancel button 65 is a button for canceling an information registration process that involves the use of the registration screen 60. When a user operates the operator 43 (FIG. 3) to input an instruction to depress the cancel button 65, the information entered into the registration screen 60 is not saved and the registration screen 60 becomes closed.

Next, the management table 231 is described with reference to FIGS. 1, 2, 7, and 8. FIG. 8 is a diagram showing the management table 231 according to the present embodiment. As shown in FIG. 8, the management table 231 includes a display apparatus ID column 701, a first tag column 702, a second tag column 703, an owner information column 704, and a logon user information column 705.

Into the display apparatus ID column 701, an identification number (default value) of the display apparatus 8 (FIG. 1) is entered. The identification number of the display apparatus 8 (FIG. 1) is set in advance.

Into the first tag column 702, first tags of the first to third input terminals 81 to 83 (FIG. 1) are entered. As the first tags of the first to third input terminals 81 to 83 (FIG. 1), the names (default names) set in advance as the respective names of the first to third input terminals 81 to 83 (FIG. 1) are used, respectively. In particular, the first tag column 702 reflects the names entered into the input terminal name column 61 described with reference to FIG. 7. Specifically, the controller 24 (FIG. 2) of the meeting support server 2 creates the first tag column 702 on the basis of the information entered into the input terminal name column 61 described with reference to FIG. 7.

Into the second tag column 703, second tags of the first to third input terminals 81 to 83 (FIG. 1) are entered. As the second tags of the first to third input terminals 81 to 83 (FIG. 1), the names (apparatus names) of the apparatuses (first to third terminal apparatuses 4 to 6) that are connected to the first to third input terminals 81 to 83 (FIG. 1) are set, respectively. In particular, the second tag column 703 reflects the names entered into the connected apparatus name registration column 62 described with reference to FIG. 7. Specifically, the controller 24 (FIG. 2) of the meeting support server 2 creates the second tag column 703 on the basis of the information entered into the connected apparatus name registration column 62 described with reference to FIG. 7.

Into the owner information column 704, the identifiers of the owners of the apparatuses (first to third terminal apparatuses 4 to 6) that are connected to the first to third input terminals 81 to 83 (FIG. 1), respectively, are entered. In particular, the owner information column 704 reflects the identifiers entered into the owner information registration column 63 described with reference to FIG. 7. Specifically, the controller 24 (FIG. 2) of the meeting support server 2 creates the owner information column 704 on the basis of the information entered into the owner information registration column 63 described with reference to FIG. 7.

Into the logon user information column 705, the identifiers of users who have logged on to the apparatuses (first to third terminal apparatuses 4 to 6) that are connected to the first to third input terminals 81 to 83 (FIG. 1), respectively, are entered. The controller 24 (FIG. 2) of the meeting support server 2 creates the logon user information column 705 on the basis of information, received from the first to third terminal apparatuses 4 to 6 (FIG. 1), that indicates the identifiers of the logon users and information, received from the first to third terminal apparatuses 4 to 6 (FIG. 1), that indicates the identifiers of logout users (FIG. 1). In a case where no user has logged on, "Null" is entered into the logon user information column 705.

Figure 9:
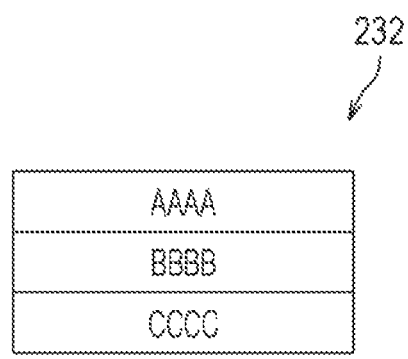
FIG. 9 is a diagram showing a first keyword group according to the embodiment of the present disclosure.

Next, the first keyword group 232 is described with reference to FIGS. 1, 2, 8, and 9. FIG. 9 is a diagram showing the first keyword group 232 according to the present embodiment. In the present embodiment, the first keyword group 232 includes the identifiers of the owners of the first to third terminal apparatuses 4 to 6 (FIG. 1) that are connected to the first to third input terminals 81 to 83 (FIG. 1). Specifically, the controller 24 (FIG. 2) of the meeting support server 2 creates the first keyword group 232 on the basis of the information entered into the owner information column 704 described with reference to FIG. 8.

Figure 10:
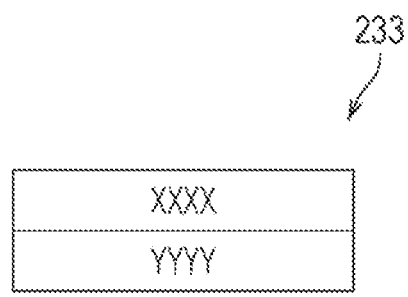
FIG. 10 is a diagram showing a second keyword group according to the embodiment of the present disclosure.

Next, the second keyword group 233 is described with reference to FIGS. 1, 2, 8, and 10. FIG. 10 is a diagram showing the second keyword group 233 according to the present embodiment. In the present embodiment, the second keyword group 233 includes the identifiers of users who have logged on to the first to third terminal apparatuses 4 to 6 (FIG. 1) that are connected to the first to third input terminals 81 to 83 (FIG. 1). Specifically, the controller 24 (FIG. 2) of the meeting support server 2 creates the second keyword group 233 on the basis of the information entered into the logon user information column 705 described with reference to FIG. 8.

Figure 11:
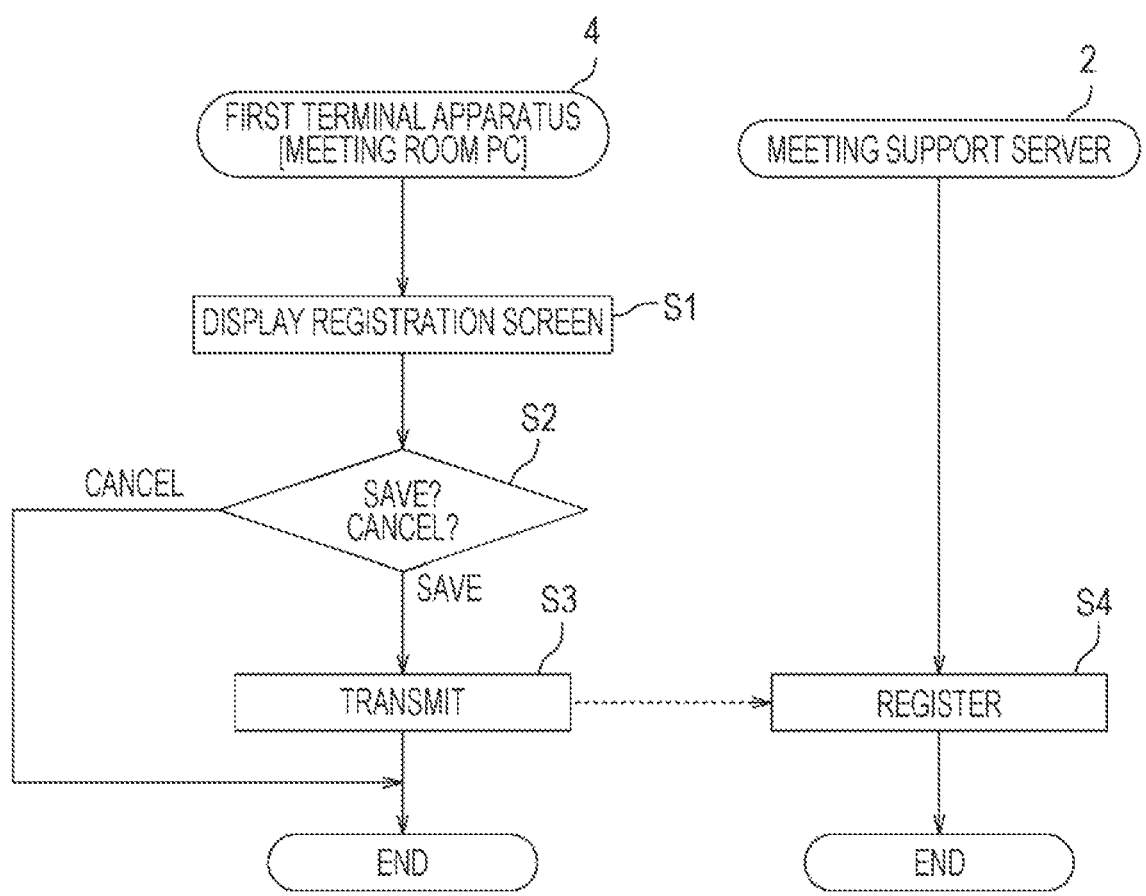
FIG. 11 is a diagram showing a first registration process according to the embodiment of the present disclosure.

Next, processes (sets of actions) that the meeting system 1 executes are described with reference to FIGS. 1 to 16. First, a first registration process is described with reference to FIGS. 1 to 3, FIGS. 7 to 9, and FIG. 11. The first registration process is a process for registering various types of information using the registration screen 60 described with reference to FIG. 7. FIG. 11 is a diagram showing a first registration process according to the present embodiment.

The first registration process shown in FIG. 11 starts when a user operates the operator 43 of the first terminal apparatus 4 to input an instruction to cause the display 44 of the first terminal apparatus 4 to display the registration screen 60.

As shown in FIG. 11, when the user inputs the instruction to display the registration screen 60, the controller 46 of the first terminal apparatus 4 causes the display 44 of the first terminal apparatus 4 to display the registration screen 60 (step S1).

Having caused the display 44 of the first terminal apparatus 4 to display the registration screen 60, the controller 46 of the first terminal apparatus 4 determines which of the save button 64 and the cancel button 65 of the registration screen 60 has been depressed (step S2).

When the user operates the operator 43 of the first terminal apparatus 4 to depress the save button 64 (step S2; SAVE), the controller 46 of the first terminal apparatus 4 transmits, to the meeting support server 2, the various types of information entered into the registration screen 60 (step S3), and then ends the process. Alternatively, when the user operates the operator 43 of the first terminal apparatus 4 to depress the cancel button 65 (step S2; CANCEL), the controller 46 of the first terminal apparatus 4 ends the process without transmitting, to the meeting support server 2, the various types of information entered into the registration screen 60.

The controller 24 of the meeting support server 2 registers, in the management table 231, the information received from the first terminal apparatus 4 (step S4). The controller 24 of the meeting support server 2 creates the first keyword group 232 with reference to the management table 231, and then ends the process.

Figure 12:
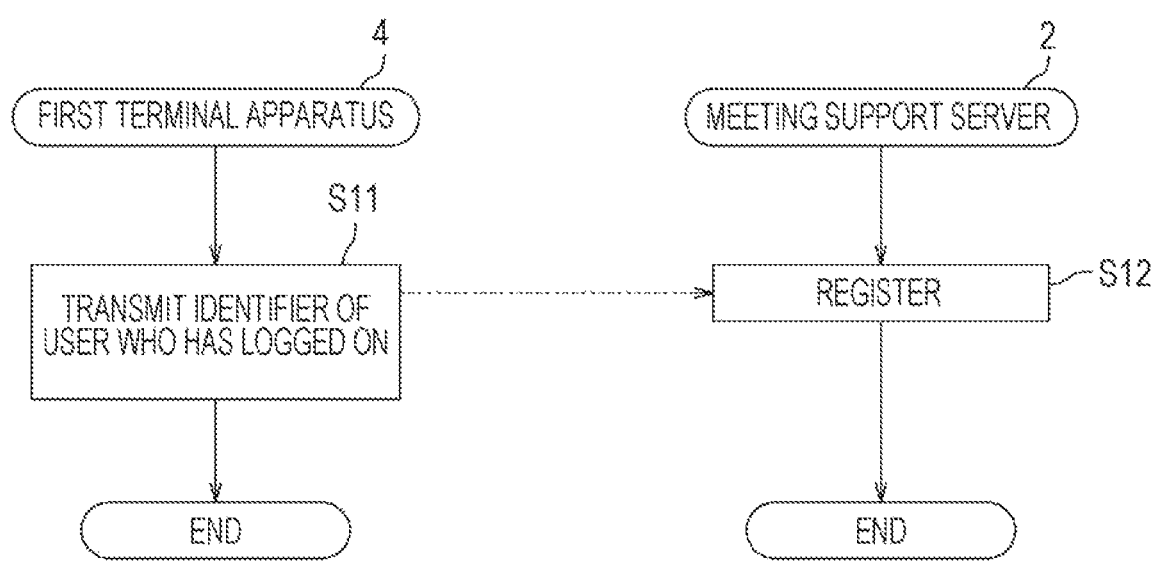
FIG. 12 is a diagram showing a second registration process according to the embodiment of the present disclosure.

Next, a second registration process is described with reference to FIGS. 1 to 3 and FIGS. 8, 10, and 12. The second registration process is a process for registering the identifier of a logon user. FIG. 12 is a diagram showing a second registration process according to the present embodiment. In particular, FIG. 12 shows a process for registering the identifier of a user who has logged on to the first terminal apparatus 4.

As shown in FIG. 12, when a user operates the operator 43 of the first terminal apparatus 4 to log on to the first terminal apparatus 4, the controller 46 of the first terminal apparatus 4 transmits, to the meeting support server 2, information indicating the identifier of the logon user (step S11), and then ends the process.

The controller 24 of the meeting support server 2 registers the identifier of the logon user in the logon user information column 705 of the management table 231 on the basis of the information received from the first terminal apparatus 4 (step S12). The controller 24 of the meeting support server 2 creates or updates the second keyword group 233 with reference to the management table 231, and then ends the process.

The foregoing has described the second registration process with reference to FIGS. 1 to 3 and FIGS. 8, 10, and 12. In a case where a user has logged on to the second terminal apparatus 5 or the third terminal apparatus 6, too, a second registration process which is similar to the process shown in FIG. 12 is executed.

Figure 13:
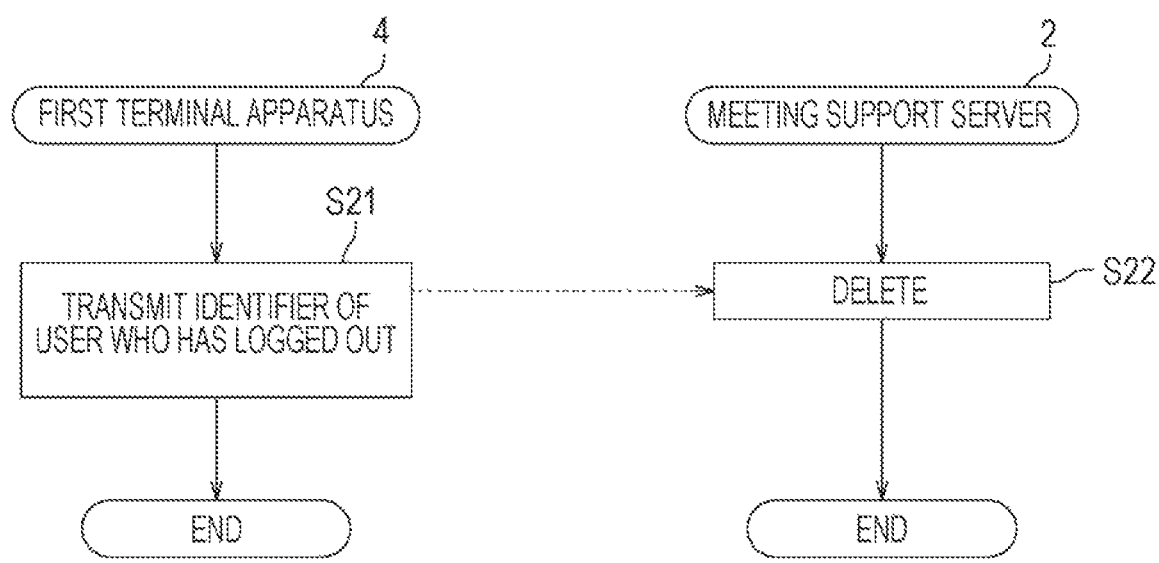
FIG. 13 is a diagram showing a deletion process according to the embodiment of the present disclosure.

Next, a deletion process is described with reference to FIGS. 1 to 3 and FIGS. 8, 10, and 13. The deletion process is a process for deleting the identifier of a logon user. FIG. 13 is a diagram showing a deletion process according to the present embodiment. In particular, FIG. 13 shows a process for deleting the identifier of a user who has logged out of the first terminal apparatus 4.

As shown in FIG. 13, when a user operates the operator 43 of the first terminal apparatus 4 to log out of the first terminal apparatus 4, the controller 46 of the first terminal apparatus 4 transmits, to the meeting support server 2, information indicating the identifier of the logout user (step S21), and then ends the process.

The controller 24 of the meeting support server 2 deletes the identifier of a logout user who corresponds to the logout user from the logon user information column 705 of the management table 231 on the basis of the information received from the first terminal apparatus 4 (step S22). The controller 24 of the meeting support server 2 deletes a keyword that corresponds to the logout user from the second keyword group 233 with reference to the management table 231, and then ends the process.

The foregoing has described the deletion process with reference to FIGS. 1 to 3 and FIGS. 8, 10, and 13. In a case where a user has logged out of the second terminal apparatus 5 or the third terminal apparatus 6, too, a deletion process which is similar to the process shown in FIG. 13 is executed.

Next, a display switching process that the meeting system 1 executes is described with reference to FIGS. 1 to 3, FIGS. 5 to 10, and FIGS. 14 to 16. The display switching process is a process for switching the display apparatus 8 from one display screen to another.

Figure 14:
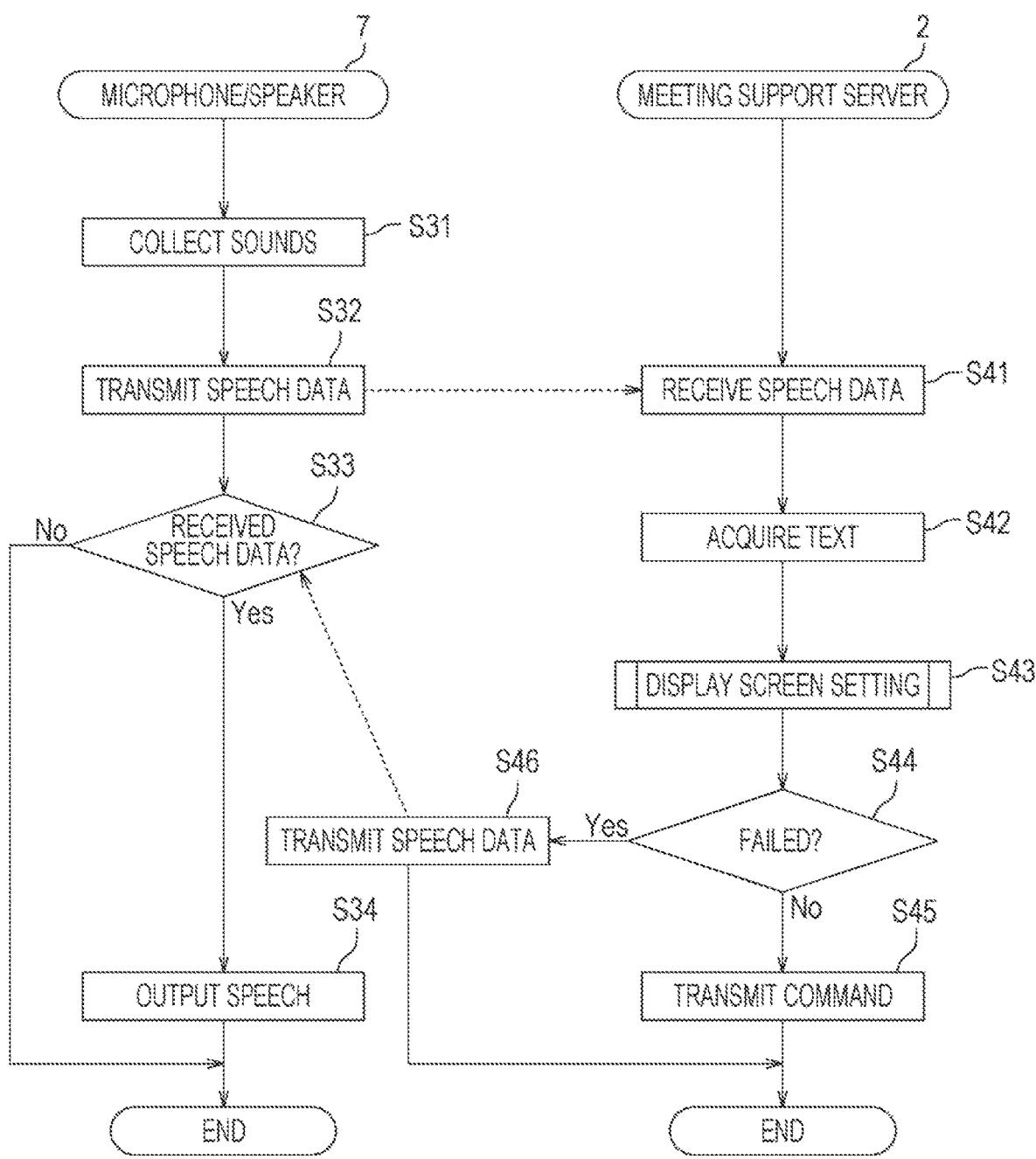
FIG. 14 is a diagram showing a display switching process according to the embodiment of the present disclosure.

First, a process that the meeting support server 2 and the microphone/speaker apparatus 7 execute is described with reference to FIGS. 1, 2, 5, and 14. FIG. 14 is a diagram showing a display switching process according to the present embodiment and, in particular, shows a process that the meeting support server 2 and the microphone/speaker apparatus 7 execute.

The display switching process starts when a user produces sounds of speech. As shown in FIG. 14, when a user produces sounds of speech, the microphone/speaker apparatus 7 collects the sounds of the user's speech (step S31) and transmits, to the meeting support server 2, speech data that corresponds to the user's speech (step S32).

When the meeting support server 2 receives the speech data from the microphone/speaker apparatus 7 (step S41), the speech recognizer 22 of the meeting support server 2 converts the speech data into text information. As a result, the controller 24 of the meeting support server 2 acquires a recognition result text (step S42).

Having acquired the recognition result text, the controller 24 of the meeting support server 2 executes a display screen setting process (step S43). Specifically, the controller 24 of the meeting support server 2 executes the switching command generation processes described with reference to FIG. 2. The display screen setting process will be described later with reference to FIG. 16.

After the execution of the display screen setting process, the controller 24 of the meeting support server 2 determines whether the controller 24 of the meeting support server 2 has failed in setting a display screen (step S44). In a case where the controller 24 of the meeting support server 2 has determined that the controller 24 of the meeting support server 2 has not failed in setting a display screen (step S44; No), the controller 24 of the meeting support server 2 transmits the switch command to the first terminal apparatus 4 (step S45), and then ends the process shown in FIG. 14.

On the other hand, in a case where the controller 24 of the meeting support server 2 has determined that the controller 24 of the meeting support server 2 has failed in setting a display screen (step S44; Yes), the controller 24 of the meeting support server 2 executes the speech data output process described with reference to FIG. 2. Specifically, the controller 24 of the meeting support server 2 transmit, to the microphone/speaker apparatus 7, speech data representing a message that prompts the user to speak again (step S46). Having executed the speech data output process, the controller 24 of the meeting support server 2 ends the process shown in FIG. 14.

After having transmitted the speech data, the microphone/speaker apparatus 7 determines whether it has received speech data from the meeting support server 2 (step S33). In a case where the microphone/speaker apparatus 7 has not received speech data from the meeting support server 2 (step S33; No), the microphone/speaker apparatus 7 ends the process shown in FIG. 14.

On the other hand, in a case where the microphone/speaker apparatus 7 has received speech data from the meeting support server 2 (step S33; Yes), the microphone/speaker apparatus 7 outputs the sounds of speech that correspond to the speech data received from the meeting support server 2 (step S34), and then ends the process shown in FIG. 14. This allows the user to use sounds of speech to again give an instruction to switch the display screen to a desired screen.

Figure 15:
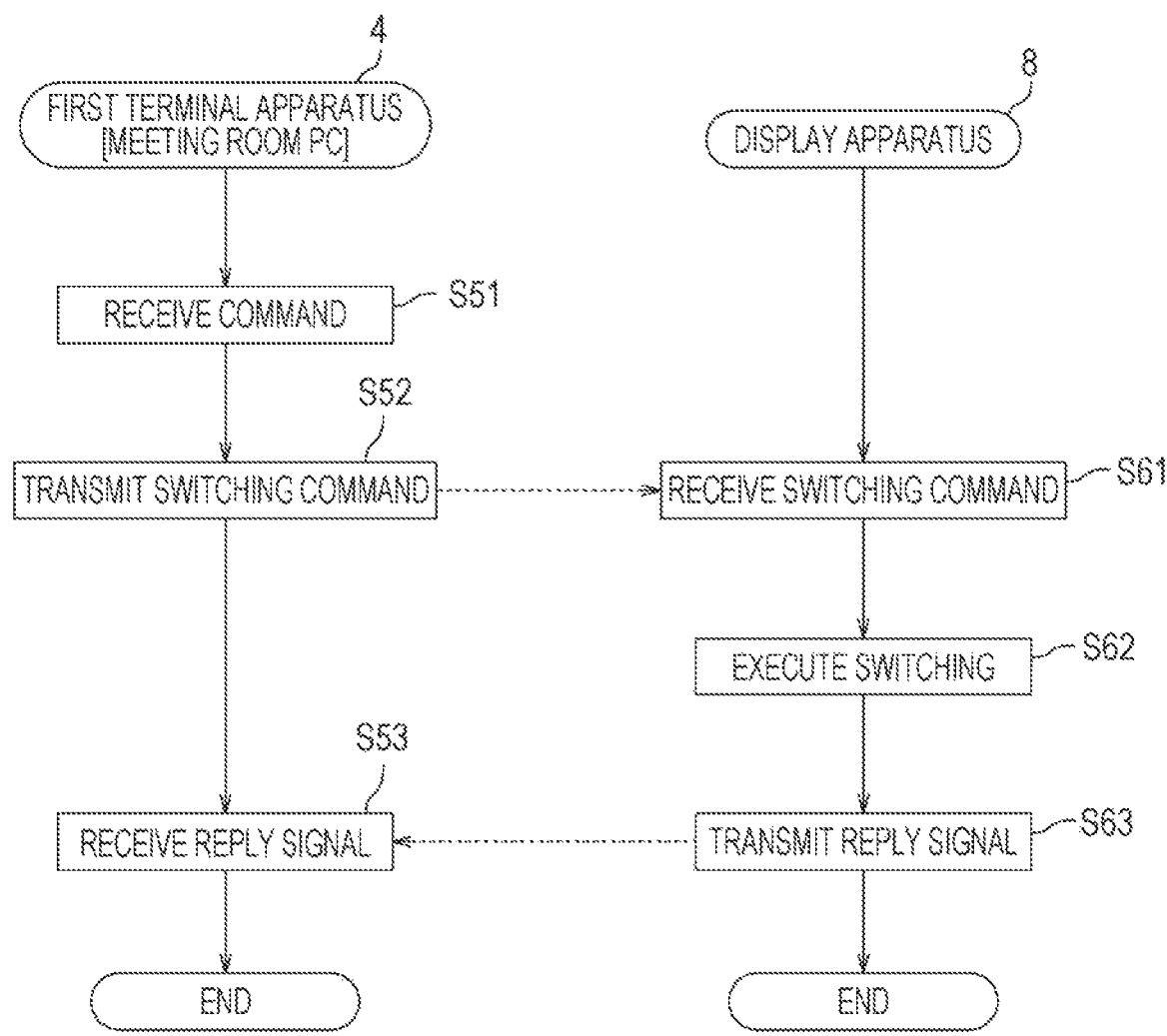
FIG. 15 is a diagram showing a display switching process according to the embodiment of the present disclosure.

Next, a process that the first terminal apparatus 4 (meeting room PC) and the display apparatus 8 execute is described with reference to FIGS. 1, 3, 6, and 15. FIG. 15 is a diagram showing a display switching process according to the present embodiment and, in particular, shows a process that the first terminal apparatus 4 (meeting room PC) and the display apparatus 8 execute.

As shown in FIG. 15, upon receiving a switching command from the meeting support server 2 (step S51), the controller 46 of the first terminal apparatus 4 transmits the switching command thus received to the display apparatus 8 (step S52).

Upon receiving the switching command from the first terminal apparatus 4 (step S61), the controller 88 of the display apparatus 8 executes a switching process in accordance with the switching command (step S62). Specifically, the controller 88 of the display 8 activates at least one of the first to third input terminals 81 to 83 in accordance with the switching command.

After having executed the switching process, the controller 88 of the display apparatus 8 transmits a reply signal to the first terminal apparatus 4 (step S63), and then ends the process shown in FIG. 15. The reply signal indicates that the switching process has been completed. Upon receiving the reply signal from the display apparatus 8 (step S53), the controller 46 of the first terminal apparatus 4 ends the process shown in FIG. 15.

Figure 16:
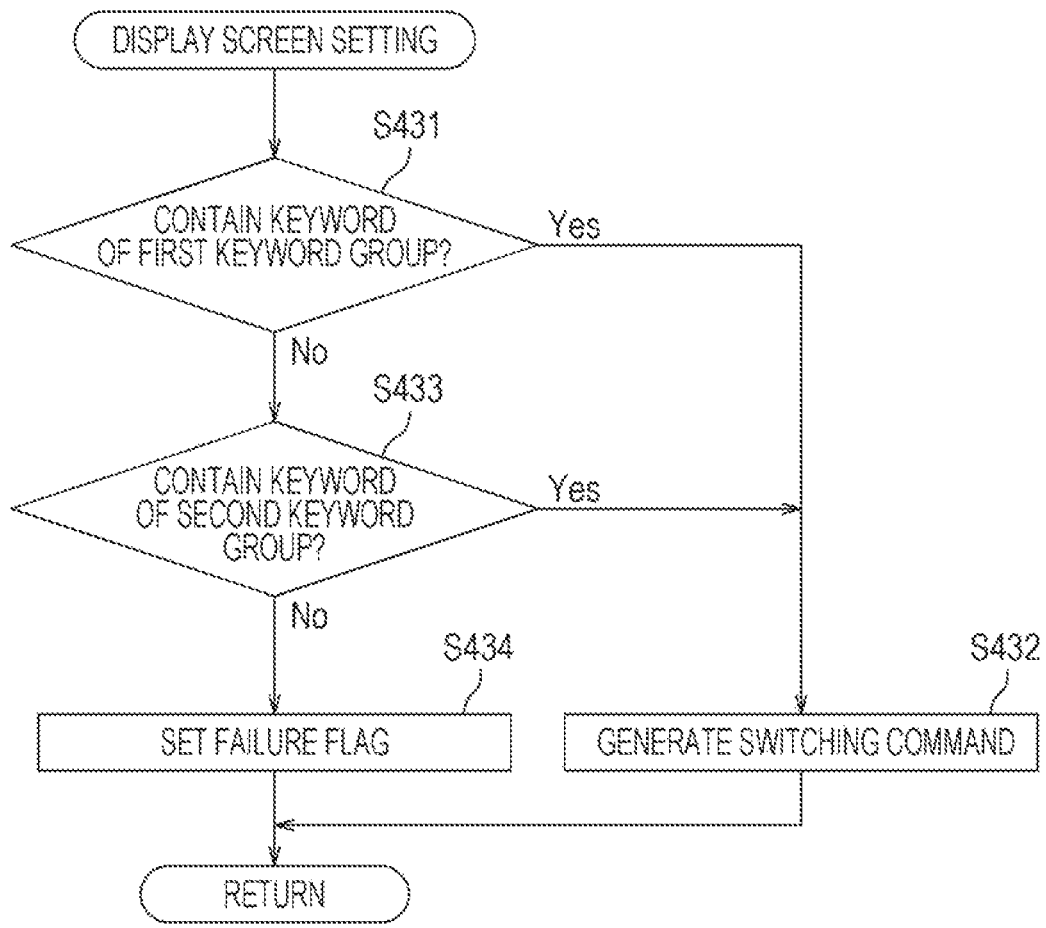
FIG. 16 is a diagram showing a display screen setting process according to the embodiment of the present disclosure.

Next, a display screen setting process (step S43 of FIG. 14) is described with reference to FIGS. 1 and 2, FIGS. 7 to 10, and FIG. 16. FIG. 16 is a diagram showing a display screen setting process according to the present embodiment.

As shown in FIG. 16, having acquired the recognition result text, the controller 24 of the meeting support server 2 determines whether the recognition result text contains a keyword of the first keyword group 232 (step S431). In particular, the controller 24 of the meeting support server 2 determines whether the recognition result text contains a keyword that indicates the identifier of the owner of any of the first to third terminal apparatuses 4 to 6. In the present embodiment, the controller 24 of the meeting support server 2 determines whether the recognition result text contains any of the keywords "AAAA", "BBBB", and "CCCC" (FIG. 9).

In a case where the controller 24 of the meeting support server 2 has determined that the recognition result text contains a keyword of the first keyword group 232 (step S431; Yes), the controller 24 of the meeting support server 2 generates a switching command with reference to the management table 231 (step S432). For example, in a case where the recognition result text contains the keyword "AAAA", the controller 24 of the meeting support server 2 searches the rows of the owner information column 704 for a row into which the identifier "AAAA", which corresponds to the keyword "AAAA", was entered. Next, the controller 24 of the meeting support server 2 searches the first tag column 702 for the input terminal "first input terminal" entered into the row thus found (FIG. 8). Then, the controller 24 of the meeting support server 2 generates a switching command to activate the first input terminal 81. Having generated the switching command, the controller 24 of the meeting support server 2 returns to the process of FIG. 14.

In a case where the controller 24 of the meeting support server 2 has determined that the recognition result text does not contain a keyword of the first keyword group 232 (step S431; No), the controller 24 of the meeting support server 2 determines whether the recognition result text contains a keyword of the second keyword group 233 (step S433). In particular, the controller 24 of the meeting support server 2 determines whether the recognition result text contains a keyword that indicates the identifier of the logon user of any of the first to third terminal apparatuses 4 to 6. In the present embodiment, the controller 24 of the meeting support server 2 determines whether the recognition result text contains the keyword "XXXX" or "YYYY" (FIG. 10).

In a case where the controller 24 of the meeting support server 2 has determined that the recognition result text contains a keyword of the second keyword group 233 (step S433; Yes), the controller 24 of the meeting support server 2 generates a switching command with reference to the management table 231 (step S432). For example, in a case where the recognition result text contains the keyword "XXXX", the controller 24 of the meeting support server 2 searches the rows of the logon user information column 705 for a row into which the identifier "XXXX", which corresponds to the keyword "XXXX", was entered (FIG. 8). Next, the controller 24 of the meeting support server 2 searches the first tag column 702 for the input terminal "first input terminal" entered into the row thus found (FIG. 8). Then, the controller 24 of the meeting support server 2 generates a switching command to activate the first input terminal 81. Having generated the switching command, the controller 24 of the meeting support server 2 returns to the process of FIG. 14.

In a case where the controller 24 of the meeting support server 2 has determined that the recognition result text does not contain a keyword of the second keyword group 233 (step S433; No), the controller 24 of the meeting support server 2 sets a flag that indicates that the controller 24 of the meeting support server 2 has failed in setting a display screen (step S434), and then returns to the process shown in FIG. 14.

The foregoing has described the display screen setting process with reference to FIGS. 1 and 2, FIGS. 7 to 10, and FIG. 16. In executing the display screen setting process shown in FIG. 16, it is necessary to set different owner identifiers for the first to third terminal apparatuses 4 to 6.

Figure 17:
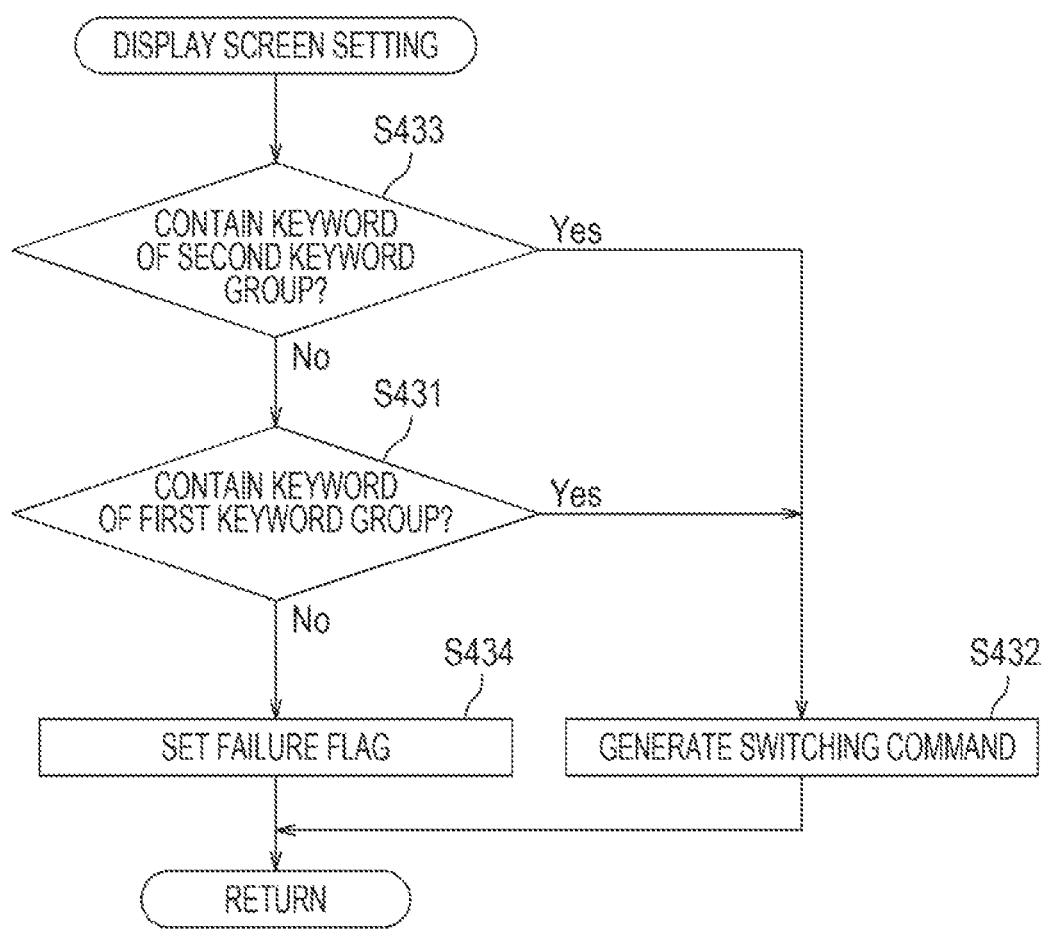
FIG. 17 is a diagram showing a display screen setting process according to another embodiment of the present disclosure.

Next, another example of a display screen setting process is described with reference to FIG. 17. FIG. 17 is a diagram showing a display screen setting process according to another embodiment of the present disclosure. The display screen setting process shown in FIG. 17 is opposite to the display screen setting process shown in FIG. 16 in terms of the order in which steps S431 and S433 are executed. That is, in the display screen setting process shown in FIG. 17, the controller 24 of the meeting support server 2 first determines whether the recognition result text contains a keyword of the second keyword group 233 (step S433) and then determines whether the recognition result text contains a keyword of the first keyword group 232 (step S431).

The display screen setting process shown in FIG. 17 makes it possible to execute a display switching appropriately even in a case where the identifier of the same owner has been set for two or more of the first to third terminal apparatuses 4 to 6.

Specifically, there is a case where a person X set as the owner of the meeting room PC (first terminal apparatus 4), which is a shared PC, brings a PC (second terminal apparatus 5 or third terminal apparatus 6) with him/her as a meeting participant. In this case, there is a possibility that the identifier of the owner set for the meeting room PC and the identifier of the owner set for the PC thus brought may coincide with each other. Further, there is also a possibility that a logon user identifier that the person X uses in logging on to the meeting room PC and a logon user identifier that the person X uses in logging on to the PC thus brought may coincide with each other. Even in such a case, the display screen setting process shown in FIG. 17 makes it possible to, by the person X logging on to only either the meeting room PC or the PC thus brought, cause the display apparatus 8 to display a screen being displayed on the PC to which the person X has logged on. For example, the display screen setting process shown in FIG. 17 makes it possible to, by the person X logging on to only a PC having stored therein a data file that needs to be displayed on the display apparatus 8 and logging out of other PCs, cause the display apparatus 8 to display a screen being displayed on the PC to which the person X has logged on. Alternatively, the simultaneous logging on of the person X to a plurality of PCs may be restricted by a system tool, such as an add-on tool, that enables restrictions on a simultaneous log-on session by Windows (registered trademark).

The foregoing has described embodiments of the present disclosure with reference to the drawings. Note, however, that the present disclosure is not limited to the embodiments described above but may be embodied in various aspects without departing from the scope of the present disclosure.

For example, the display apparatus 8 may display an image that notifies a user which input terminal has been activated in accordance with the user's speech. An image that notifies a user of an activated input terminal shows, for example, the name (such as "D-SUB terminal", "HDMI (registered trademark) terminal", or "DisplayPort") of the activated input terminal. Alternatively, the display apparatus 8 may display an image that notifies a user which terminal apparatus is connected to an input terminal activated in accordance with the user's speech. An image that notifies a user which terminal apparatus is connected to an activated input terminal shows, for example, the name (such as "first terminal" or "second terminal") of the terminal apparatus.

Further, although the embodiments of the present disclosure have described the meeting system 1, the present disclosure may be applied to any system that includes a display apparatus. For example, the present disclosure may be applied to a lecture system that is used in a juku or a school and a display system that is used at home.

Further, although the embodiments of the present disclosure use the microphone/speaker apparatus 7, the first terminal apparatus 4 (meeting room PC) or the display apparatus 8 may alternatively have the function of the microphone/speaker apparatus 7.

Further, although the embodiments of the present disclosure use the meeting support server 2 as an operational support apparatus, the first terminal apparatus 4 (meeting room PC) or the display apparatus 8 may alternatively be used as an operational support apparatus.

Further, although, in the embodiments of the present disclosure, the first terminal apparatus 4 transmits, to the display apparatus 8, a switching command transmitted from the meeting support server 2, the meeting support server 2 may alternatively transmit a switching command to the display apparatus 8.

Further, although, in the embodiments of the present disclosure, the display apparatus 8 includes three input terminals (first to third input terminals 81 to 83), the number of input terminals that the display apparatus 8 includes is not limited to 3, but the display apparatus 8 needs only include a plurality of input terminals.

Further, although the embodiments of the present disclosure uses, in order to acquire a user's speech, an apparatus (microphone/speaker apparatus 7) including a function of collecting sounds of speech and a function of outputting sounds of speech, an apparatus including only the function of collecting sounds of speech of the function of collecting sounds of speech and the function of outputting sounds of speech may alternatively be used.

Further, although, in the embodiments of the present disclosure, the management table 231 includes the display apparatus ID column 701, the first tag column 702, the second tag column 703, the owner information column 704, and the logon user information column 705, the second tag column 703 may be omitted. In this case, the connected apparatus registration column 62 may be omitted from the registration screen 60.

The present disclosure is applicable to systems, such as meeting systems, lecture systems, lesson systems, in which display apparatuses are used.

The present disclosure contains subject matter related to that disclosed in Japanese Priority Patent Application JP 2018-103827 filed in the Japan Patent Office on May 30, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An operational support apparatus that supports operation of a display apparatus, comprising:
    a speech recognizer that converts speech data into text information;
    a controller that controls operation of the operational support apparatus; and
    a memory having stored therein a management table that associates a person with an input terminal of the display apparatus,
    wherein in a case where the text information contains a keyword that indicates the person, the controller identifies, with reference to the management table, which of input terminals of the display apparatus is associated with the person, and
    the controller generates a switching command to activate the input terminal thus identified.

2. The operational support apparatus according to claim 1, wherein the management table associates a second identifier that indicates a person who has logged on to a terminal with an input terminal of the display apparatus,
    in a case where the text information contains a keyword that indicates the second identifier, the controller identifies an input terminal to which the terminal corresponding to the person who has logged on is connected.

3. The operational support apparatus according to claim 1, wherein the management table associates a first identifier that indicates an owner of a terminal with an input terminal of the display apparatus, and
    in a case where the text information contains a keyword that indicates the first identifier, the controller identifies an input terminal associated with the owner.

4. An operational support method for supporting operation of a display apparatus, comprising:
    converting speech data into text information;
    generating a switching command to activate at least one of input terminals of the display apparatus; and
    displaying image information received by the input terminal activated by the switching command,
    wherein the generating the switching command includes,
        in a case where the text information contains a keyword that indicates a person, identifying, with reference to a management table that associates the person with an input terminal of the display apparatus, which of the input terminals of the display apparatus is associated with the person, and
        generating the switching command to activate the input terminal thus identified.

5. An operational support system comprising:
    a display apparatus; and
    an operational support apparatus that supports operation of the display apparatus,
    wherein the operational support apparatus includes
        a speech recognizer that converts speech data into text information,
        a controller that controls operation of the operational support apparatus; and
        a memory having stored therein a management table that associates a person with an input terminal of the display apparatus,
    in a case where the text information contains a keyword that indicates the person, the controller identifies, with reference to the management table, which of input terminals of the display apparatus is associated with the person,
    the controller generates a switching command to activate the input terminal thus identified, and
    the display apparatus displays image information received by the input terminal activated by the switching command.

6. The operational support system according to claim 5, further comprising an apparatus that is connected to an input terminal of the display apparatus,
    wherein when a user has logged on to the apparatus, the apparatus transmits, to the operational support apparatus, information indicating the user who has logged on.

7. The operational support system according to claim 5, further comprising an apparatus that is connected to an input terminal of the display apparatus,
    wherein when a user has logged out of the apparatus, the apparatus transmits, to the operational support apparatus, information indicating the user who has logged out.

* * * * *